(12) United States Patent
Hageman et al.

(10) Patent No.: US 6,371,574 B1
(45) Date of Patent: Apr. 16, 2002

(54) DRY INTERFACE CORNER VEHICLE BRAKING SYSTEM

(75) Inventors: John Benjamin Hageman, Vandalia; Bryan Peter Riddiford, Dayton, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/653,397

(22) Filed: Sep. 1, 2000

(51) Int. Cl.[7] .............................. B60T 8/32; B60T 8/42
(52) U.S. Cl. ................... 303/113.4; 303/115.2
(58) Field of Search .............. 303/3, 15, 113.1–113.5, 303/115.2

(56) References Cited

U.S. PATENT DOCUMENTS

| | | | | |
|---|---|---|---|---|
| 5,246,283 A | * | 9/1993 | Shaw et al. ............... | 303/115.2 |
| 5,312,172 A | * | 5/1994 | Takeuchi ................. | 303/115.2 |
| 5,499,865 A | * | 3/1996 | Katagiri et al. .......... | 303/115.2 |
| 5,597,214 A | * | 1/1997 | Katagiri et al. ............... | 303/10 |
| 5,749,633 A | * | 5/1998 | Baumgartner ............ | 303/113.1 |
| 5,758,930 A | * | 6/1998 | Schiel et al. ............. | 303/113.4 |
| 5,836,659 A | * | 11/1998 | Feigel et al. ............. | 303/115.2 |
| 5,895,098 A | | 4/1999 | Stacey et al. ................... | 303/3 |
| 6,019,437 A | | 2/2000 | Barron ..................... | 303/113.1 |
| 6,149,247 A | * | 11/2000 | Hofmann et al. ........ | 303/113.4 |

* cited by examiner

Primary Examiner—Christopher P. Schwartz
(74) Attorney, Agent, or Firm—Scott A. McBain (57) ABSTRACT

A braking assembly for providing a braking force to a wheel brake of a vehicle based upon receipt of an electrical brake signal is provided. The brake assembly comprises an actuator including a motor that applies and releases a piston within an actuator body. The actuator is fluidly connected to a wheel brake whereby the wheel brake can be applied and released. A solenoid valve is interposed between the actuator and the wheel brake on a primary fluid path for opening and closing the fluid connection. A step piston is placed within a secondary fluid path between the actuator and the wheel brake and operates to momentarily increase fluid displacement applied to the wheel brake when the solenoid valve closed.

24 Claims, 5 Drawing Sheets

DRY INTERFACE CORNER VEHICLE BRAKING SYSTEM

INCORPORATION BY REFERENCE

Baumgartner U.S. Pat. No. 5,749,633 is incorporated by reference herein in so that electric brake by wire systems (BBW) need not be described in detail hereinafter.

The above referenced invention relates to an improvement in brake actuator design and specifically improves initial brake system response time.

BACKGROUND OF THE INVENTION

Hydraulic braking systems have typically been the basis for vehicle braking systems, especially automotive braking systems. Hydraulic systems are used to convert fluid pressure into linear and/or mechanical motion. Such systems allow the source of the hydraulic pressure to be positioned remotely from the cylinders which affect the braking action. These systems comprise an actuator, such as a brake pedal, reservoir fluid which is responsive to pressure applied by the actuator, (such as a master cylinder) and means for converting the hydraulic pressure to a braking force, generally fluid cylinders. Mechanical braking pressure is achieved by utilizing the force of the depression of the brake pedal by the driver to increase the pressure on the master cylinder. Such systems are typically accompanied by a vacuum boost which multiplies the force supplied to the brake pedal, throughout the braking operation. The increased pressure in the master cylinder is then transmitted through fluid lines to the fluid cylinders. The fluid cylinders operate the calipers thereby forcing the calipers and brake pads against the rotors and/or drums which slows the vehicle by frictional force.

Hydraulic systems of the above described type have many disadvantages. These include the large amount of volume and mass that the master cylinder vacuum booster, ABS modulator and hydraulic line add to the completed vehicle. Installation of standard hydraulic braking systems is also complicated and labor intensive. Additionally, the large number of parts and installation also adds to repair and maintenance issues as individual parts reach the end of their useful life. Standard hydraulic braking systems have also become dependent on the vacuum boost to assist in braking operations. However, vehicles such as electric or hybrid vehicles do not produce vacuum as a by-product of the vehicle operation. Thus vacuum boost is not an option on such vehicles.

In order to overcome some of the hydraulic system disadvantages, electric brake systems are known. While there are many variant forms, including electrical hydraulic systems, the use of electric in the variant forms is also referred to as a brake by wire brake system (BBW). BBW describes the ability to activate vehicle wheel brakes via an electric signal generated by an onboard processor/controller as a result of input signals thereto. Brake torque is applied to the wheels without direct mechanical interaction between the vehicle's brake pedal and the wheel brake.

A particular type of BBW systems is known as a "dry interface corner" system (DIC). The typical DIC system operates when a driver inputs a force to the brake pedal. A force sensor and/or travel sensor attached to the pedal transmits an electronic signal to an electronic controller, which in turn sends the signal to the self contained braking device typically located at each wheel of the vehicle. The DIC system is known as a hybrid system in that electric signals are used to generate the type and amount of braking force required at each wheel of the vehicle with electrical wires rather than standard hydraulic brake lines. Located at each corner of the vehicle is a self-contained module which takes the electrical signal and mechanically brakes the vehicle. The self contained module utilizes an individual motor that drives a ball screw piston assembly which pressurizes hydraulic brake fluid to ultimately apply the brake caliper to a rotor at that corner of the vehicle. Such a DIC system significantly reduces assembly cost. The individual modules can be separately assembled and fluid filled prior to the manufacture of the vehicle. DIC modules then only need to be bolted to the automobile during the assembly process and plugged in using standard electrical connections. Finally, the elimination of hydraulic lines stretching throughout the vehicle as well as the elimination of the master cylinder booster, and ABS modulator reduces space requirements within the engine compartment.

Due to the modularity of the DIC system, each of the individual components is preferably kept relatively small while still meeting a baseline brake response. Such a system keeps the DIC module a manageable size and does not overextend the existing electrical system on a vehicle. Such a system works well in most brake system applications. However, in certain instances the vehicle operator desires to decrease the initial brake system response time and shorten the vehicle stopping distance. However, the amount of fluid displacement to achieve pressure is limited by the size and speed of the motor and the gear ratio of the ball screw assembly. While increasing the size of the motor or the piston assembly and/or a combination thereof can decrease the initial brake system response time and result in a shorter vehicle stopping distance, such systems are unnecessary or impractical for most braking applications. Furthermore, such a combination would also result in greater size requirements for the DIC module and could have larger electrical load requirements from the vehicle power system.

SUMMARY OF THE INVENTION

Accordingly, it is a feature of the present invention to provide a vehicle braking system which overcomes the disadvantages of prior art vehicle braking systems by temporarily applying a greater amount of fluid to the brake caliper for the same amount of input motor turns. This feature is utilized in those situations in which the vehicle operator has indicated, through the brake pedal, that a shorter vehicle stopping distance is desired. The preferred embodiment of the invention is accomplished with a step piston which is added to the actuator and is preferably activated by closing a normally open solenoid valve. The step piston will result in a higher reaction load on the motor and thus limits the maximum pressure that can be developed while the step piston is in operation. Upon receipt of a signal from the vehicle operator that an improved vehicle stopping distance is desired, the normally open solenoid valve is closed for a very short period of time, after which it is re-opened at a pre-determined pressure during the brake apply, allowing the brake actuator to develop the desired maximum system pressure. The invention allows more initial fluid displacement to the brake caliper, which is not limited by the motor or actuator. The invention improves initial brake system response time and shortens vehicle stopping distance without increasing either the size of the DIC brake module or the electrical system requirements of the vehicle.

This feature, along with other features of the present invention, is achieved in an assembly for providing a braking force to a wheel of the vehicle based upon receipt of an electrical signal. The braking assembly comprises an actuator including a motor that applies and releases a piston within an actuator body. The actuator is fluidly connected to a wheel brake whereby the wheel brake can be applied and released. A valve is interposed between the actuator and the wheel brake on a primary fluid path for opening and closing the fluid connection on the primary fluid path. A secondary fluid path between the actuator and the wheel brake is also provided. A mechanism for increasing the fluid displacement or flow downstream of the secondary fluid path is provided and operates when the valve on the primary fluid path is closed.

In accordance with a more specific feature of the invention, the mechanism for increasing the fluid displacement on the secondary fluid path is preferably a step piston which includes first and second surfaces. The surface area of the second surface is generally greater than the surface area of the first surface and is also located downstream of the first surface. A second valve assembly is also disposed on the secondary fluid path between the actuator and the step piston. The second valve assembly preferably provides an orifice which controls the rate at which fluid flows upstream in the secondary path after the first valve in the primary path has been opened. As such, the gain in fluid pressure initially achieved by use of the step piston at the wheel brake is not lost when the first valve in the primary fluid path is opened.

In accordance with another aspect of the invention, a braking system to provide a braking force to a plurality of wheels of a vehicle is provided. This braking system comprises a plurality of actuators for braking the plurality of wheels, each of the actuators fluidly connected to at least one wheel brake on a primary fluid path. A sensor, for sensing a brake force and/or travel applied to a brake pedal is also provided. The sensed force and/or travel is sent to a controller which electrically generates a brake signal to the plurality of actuators based upon the force and/or travel applied to the brake pedal. A valve is provided on the primary path. This valve is normally opened below a preset value of the rate of change of sensed force or travel applied to the brake pedal. The primary path is closed when the brake signal exceeds that preset value. A secondary fluid path between the actuator and the wheel brake is also provided. The secondary fluid path includes a mechanism for multiplying the fluid displacement in the second fluid path between the mechanism and the wheel brake. A pressure sensor measures the fluid pressure generated in the second fluid path. Once the pressure sensor determines that fluid pressure exceeds a preset value, a signal is sent from the pressure sensor to the controller and thereupon from the controller to the mechanism for opening and closing the primary path, which then reopens the primary path.

In yet another aspect of the invention, a method is provided for initially boosting brake pressure. It includes providing a brake actuator assembly having a fluid displacement rate and providing a wheel brake. The wheel brake actuator assembly is connected to the wheel brake by both a primary fluid path and via a secondary fluid path. The operator of the vehicle generates an electrical brake signal to activate the brake actuator. The electrical brake signal is measured and compared against a preset value. If it is determined that the signal exceeds a preset value the normally open primary path is closed and fluid pressure is diverted to the secondary path. The fluid displacement rate in the secondary path is multiplied and the multiplied fluid displacement is provided to the wheel brake via the secondary path. On determining the fluid pressure in the secondary path exceeds a second preset value, the first primary path is reopened. The method further includes controllably reducing the fluid pressure and restoring displaced fluid in the secondary path after reopening the primary path.

Thus, it is a principal object of the present invention to provide an improved electrical brake assembly which provides a better initial brake system response time.

It is yet another object of the present invention to provide an improved electric brake system which results in shorter vehicle stopping distances.

Still another object of the present invention is to provide an electric brake assembly which provides a better initial brake system response time while not limiting the maximum pressure that can be developed by the wheel brake.

Yet another object of the invention to provide an improved electric brake assembly which does not increase electrical current draw from the vehicle.

Still yet another object of the present invention is to provide an improved vehicle braking system in which fluid displacement can be momentarily multiplied resulting in shorter vehicle stopping distances.

These and other objects of the invention will become apparent to those skilled in the art upon reading and understanding the following detailed description of the invention.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE INVENTION

Figure 1:
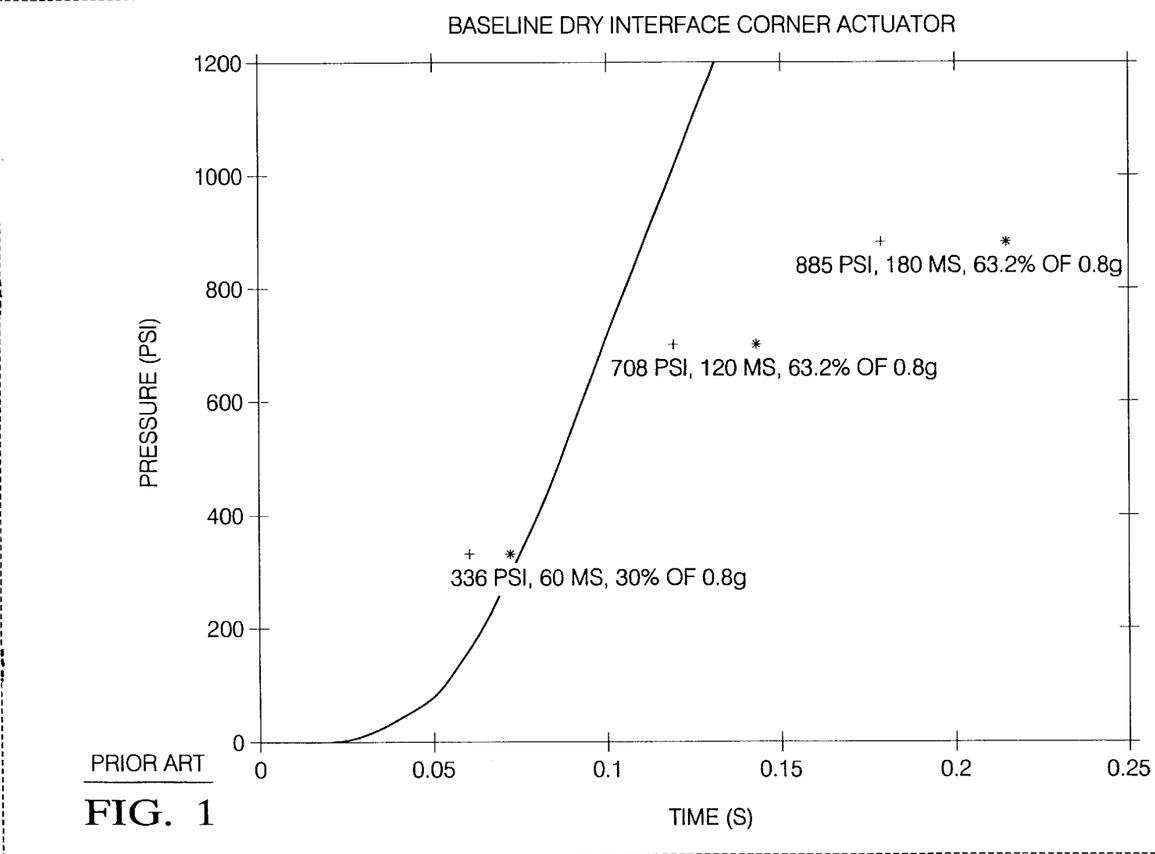
FIG. 1 is a graphical illustration showing the performance of an electric braking system without the improvement of the present invention.

Referring to the drawings, where the showings are for the purpose of illustrating the preferred embodiment of the invention only, and not for the purpose of limiting same, FIG. 1 shows the performance of a prior electric braking system, and specifically a dry interface corner actuator which does not utilize the improvement of the present invention. As depicted therein, an actuator using a gearset with a ratio of 5 to 1 and a ballscrew with six turns per one inch of travel is capable of developing maximum pressure of 2100 psi with a 190 oz-in 7395 rpm motor for a specific caliper. This actuator assembly develops slightly less than a 100 psi in 50 ms and 336 psi in 60 ms. The present invention improves the initial response time as can be seen from the graph of FIG. 6 and as will be described hereafter.

Figure 2:
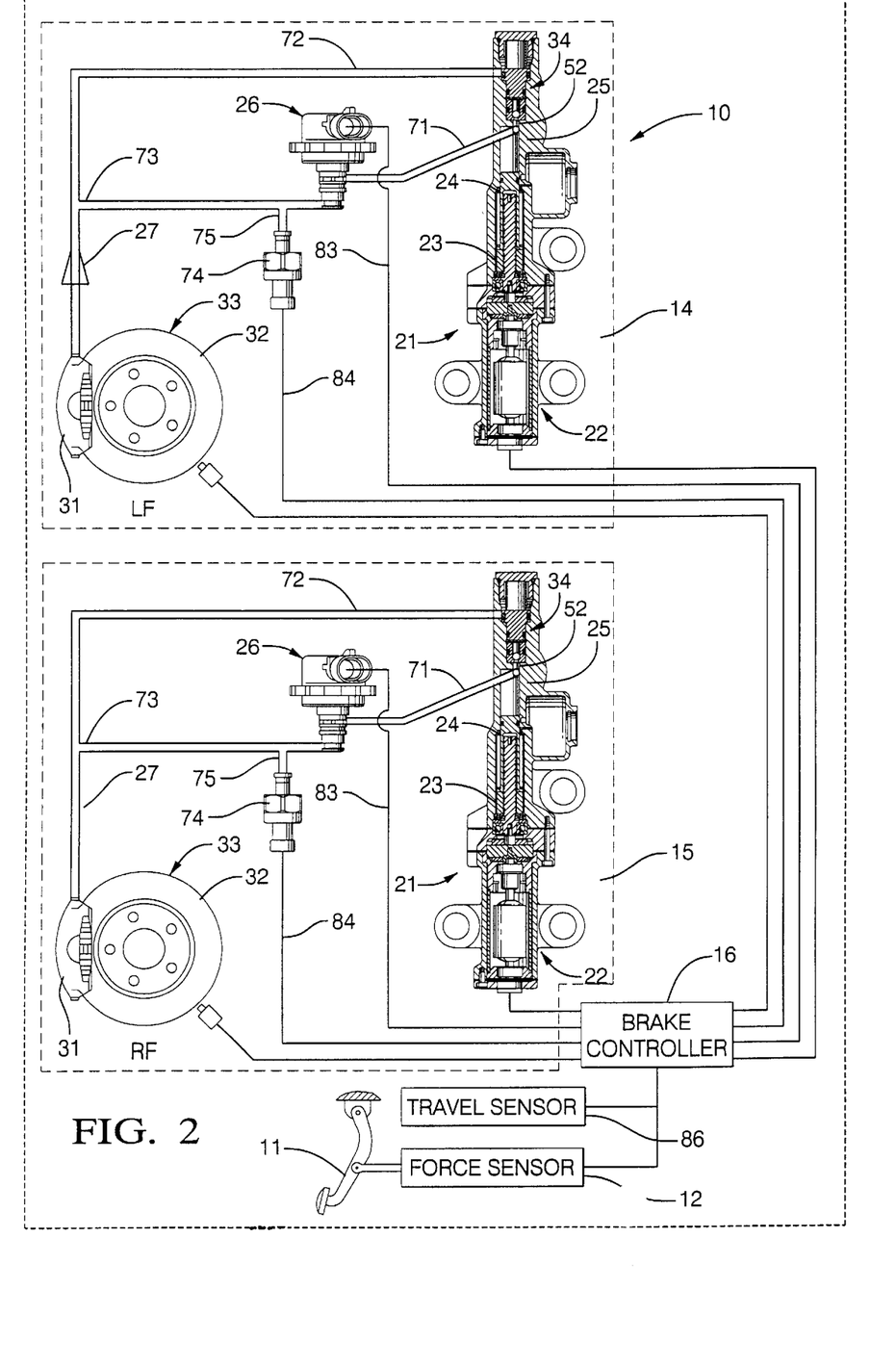
FIG. 2 is a schematic illustration of a braking system of the present invention.

FIG. 2 schematically illustrates a dry interface corner braking system of the present invention. As shown brake pedal 11 is acted upon by the operator of the vehicle. This force is applied to a force sensor 12 which in turn generates an electrical signal to a left front corner 14 and a right front corner 15 of a vehicle. While FIG. 2 only shows the left and right front corners 14, 15, it will be appreciated that the brake signal is transmitted by sensor 12 to all four corners of the vehicle, or each of the individual braking systems of the vehicle as the case may be. The preferred embodiment shows the boost assist step actuators of the present invention used in the front wheel brake applications. It will be appreciated that others, upon experimentation with specific applications, may provide the invention at the rear brakes, both front and rear brakes, or some combination thereof.

Figure 3:
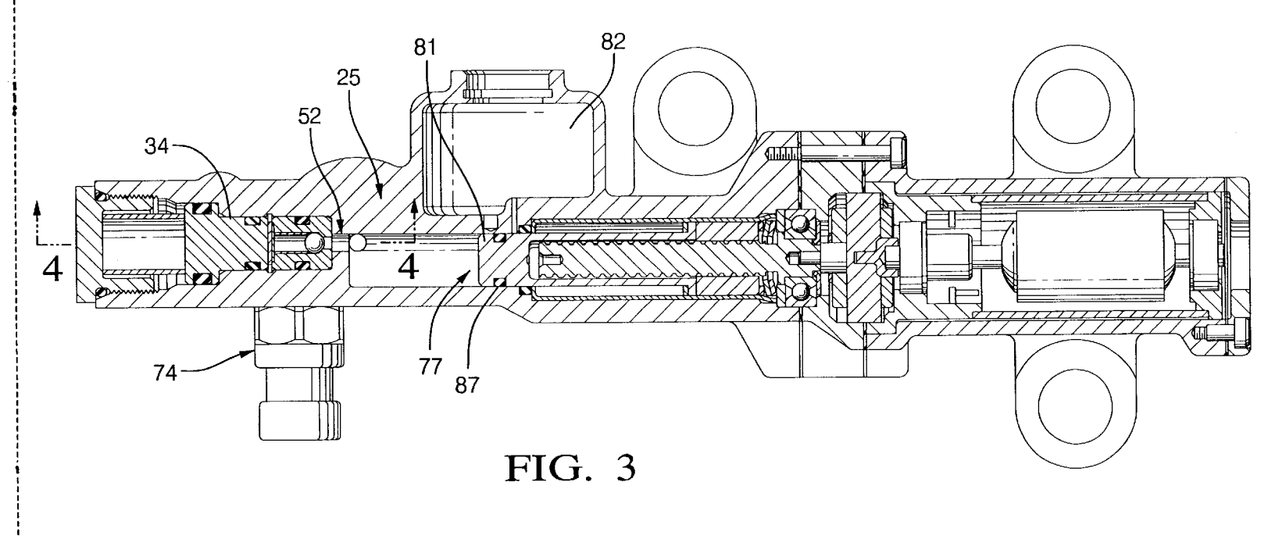
FIG. 3 is an elevation view, partially in section, of the braking system of the present invention.
Figure 4:
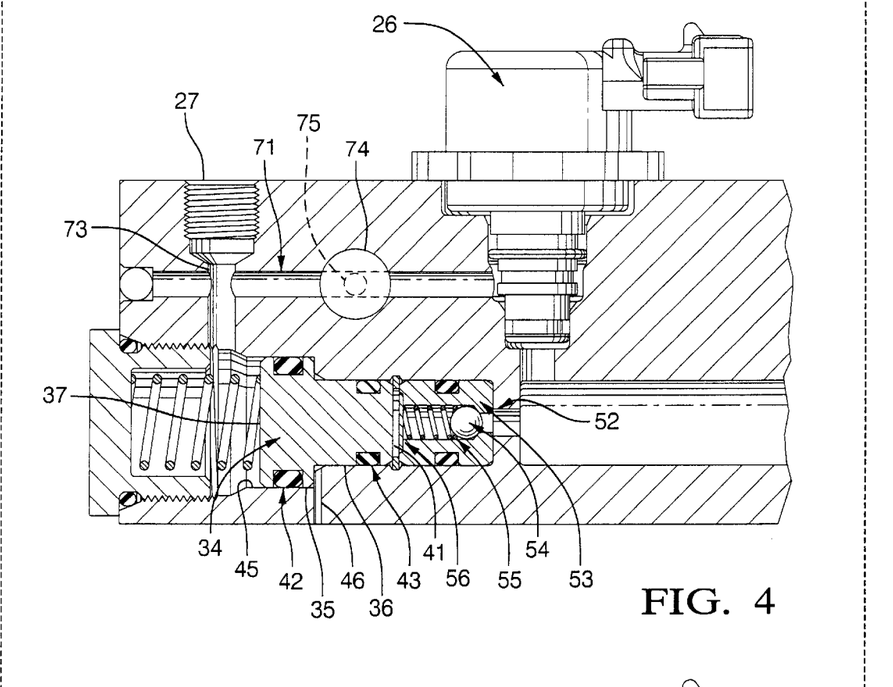
FIG. 4 is an elevation view, partially in section, of one feature of the present invention taken along line 4—4 of FIG. 3.
Figure 5:
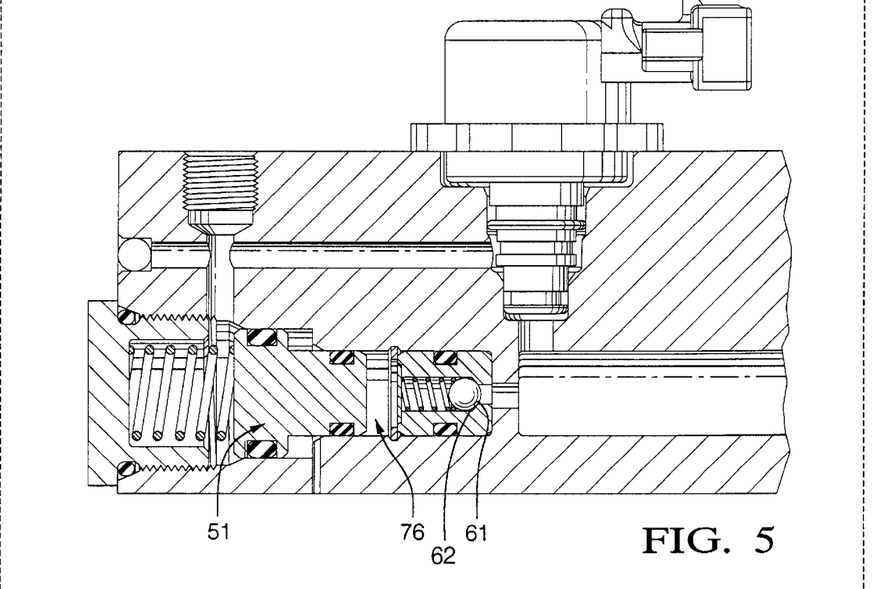
FIG. 5 an elevation view similar to FIG. 4 showing the step piston of the present invention in operation.

A left front corner 14 of FIG. 2 will now be described in detail. Right front corner 15 is identical and is numerically identified in FIG. 2 with identical numerals. Force sensor 12 and/or travel sensor 86 transmits a brake signal to an electronic control module 16 which in turn is electrically connected to an actuator assembly 21 and specifically to a motor 22. Motor 22 drives a gear mechanism and ball screw assembly 23 that applies and releases a hydraulic piston 24 within an actuator body 25. Extending from actuator body 25 is a primary fluid line 71. Located within primary line 71 is a normally open solenoid valve 26. During a normal brake apply and release, displaced brake fluid flows within primary fluid line 71, through normally open solenoid valve 26 and through outlet 27. The fluid pressure therein applies and releases brake calipers 31 against rotor 32 which comprises a wheel brake 33. As can be seen in FIG. 3 through FIG. 5, actuator assembly 21 includes a step piston 34. The piston 34 includes two adjacent generally co-axial cylinders 35 and 36. Cylinder 35 has a downstream surface area 37 and cylinder 36 has an upstream surface area 41 smaller than surface area 37. In the preferred embodiment, surface area 37 is twice that of surface area 41. O-rings 42 and 43 seal step piston 34 within the interior of piston wall 45. The area between O-rings 42 and 43 is vented through a channel 46.

Located downstream of hydraulic piston 24 is a flow valve assembly 51. Flow valve assembly 51 is connected to hydraulic piston 24 via a channel 52. Included within the body 53 of flow valve assembly 51 is a ball 54, a spring 55, and a retainer plate 56. Flow valve assembly 51 is held in place by a retaining ring 57. Ball 54 sits within a ball seat 61 which includes a small control orifice 62 fluidly connecting ball seat 61 with channel 52.

As discussed above and as can be seen from FIG. 2, solenoid valve 26 is located along a primary fluid line 71 extending from a point upstream of channel 52 to brake caliper 31. A secondary or bypass fluid line 72 extends from the outlet of flow valve assembly 51 to an intersection point 73 with primary fluid line 71. As seen in FIG. 2, pressure transducer (or pressure sensor) 74 is located downstream of solenoid valve 26 and intersects primary line 71 via a port 75.

During normal braking operations, solenoid valve 26 is in a normally open state. Accordingly, the operator presses brake pedal 11 which is sensed by force sensor 12 and sends a signal to brake control module (or brake controller) 16. Brake controller 16 in turn generates a signal to actuate motor 22 and drive ball screw assembly 23 and hydraulic piston 24 to pressurize primary fluid line 71. As seal 87 covers a bypass hole 81, a fluid reservoir 82 is isolated and braking of wheel brake 33 is accomplished by piston surface area 77 displacing fluid through the primary fluid line 71. However, under certain conditions a vehicle operator may desire to stop the vehicle in a shorter stopping distance by applying force to brake pedal 11 at a faster rate. The rate of change of force from sensor 12 or the rate of change of travel from sensor 86 is compared to a preset value. If the sensed rate of change exceeds the preset value, (preferably equivalent to 3000 psi per second), electronic brake control module 16 sends a signal to solenoid valve 26 (via a line 83) to close. As solenoid valve 26 closes, brake fluid flows through channel 52 and unseats ball 54. Brake fluid flows freely through flow valve assembly 51 and builds pressure against upstream surface area 41 of step piston 34. In the preferred embodiment, the area of upstream surface area 41 is generally equal to piston surface area 77. Therefore, when solenoid valve 26 is closed, the hydraulic piston 24 and step piston 34 effectively move the fluid column to the left as shown in FIG. 5. As discussed previously the downstream surface area 37 is generally twice that of upstream surface area 41. Therefore, the amount of fluid displaced to wheel brake 33 is twice the amount displaced (for the same number of motor turns) when the solenoid valve 26 is opened. This results in an improved initial brake system response time and consequently a shorter vehicle stopping distance, as can be seen graphically at FIG. 6.

It will also be appreciated that the ratio of downstream surface area 37 to upstream surface area 41 causes the reaction load on motor 22 to be twice as much as if solenoid valve 26 were left open. Thus, the applied pressure acting against hydraulic piston 24 and specifically piston surface area 77 is twice that of when solenoid valve 26 is open and twice that of the downstream pressure in channels 72, 73, and 75. If solenoid valve 26 were kept closed throughout a maximum pressure brake pedal apply, motor 22 would stall at a lower than acceptable wheel brake apply pressure. In order to prevent motor 22 from stalling because of high apply pressure, pressure transducer 74 constantly senses the pressure downstream of solenoid valve 26 and sends such signal to brake controller 16 via line 84. After solenoid valve 26 is closed, and once the downstream pressure sensed by pressure transducer 74 exceeds a predetermined (or preset value) wheel brake pressure (generally 400–500 psi), brake controller 16 sends a signal via line 83 to reopen solenoid valve 26.

After the solenoid valve 26 is reopened at the predetermined wheel brake pressure, the reacting pressure force against motor 22 is shifted back to the piston surface area 77 of hydraulic piston 24 from surface 37 of step piston 34. During the initial brake apply contemplated by the invention, flow valve assembly 51 has assumed the position shown in FIG. 5 in which fluid pressure within a cavity 76 exceeds that of piston surface area 77. The reopening of solenoid valve 26 balances the pressure across flow valve assembly 51 and specifically between downstream surface area 37 and piston surface area 77. Thus the reaction load pushes step piston 34 back to the right, as shown in FIG. 5. This motion of step piston 34 results in a loss of fluid displacement in the system due to the area ratio of surfaces 37 and 41. As seen in FIGS. 4 and 5, the rate at which step piston 34 can move depends on the rate at which the fluid trapped in cavity 76 can exit through control orifice 62 and ball seat 61. The actual size of control orifice 62 is dependent upon the design of the actuator 21 and wheel brake 33 displacement. However, for actuator assembly 21 graphically represented in FIG. 6 a control orifice 62 of size equivalent to 0.38 mm diameter has been found to be useful.

Figure 6:
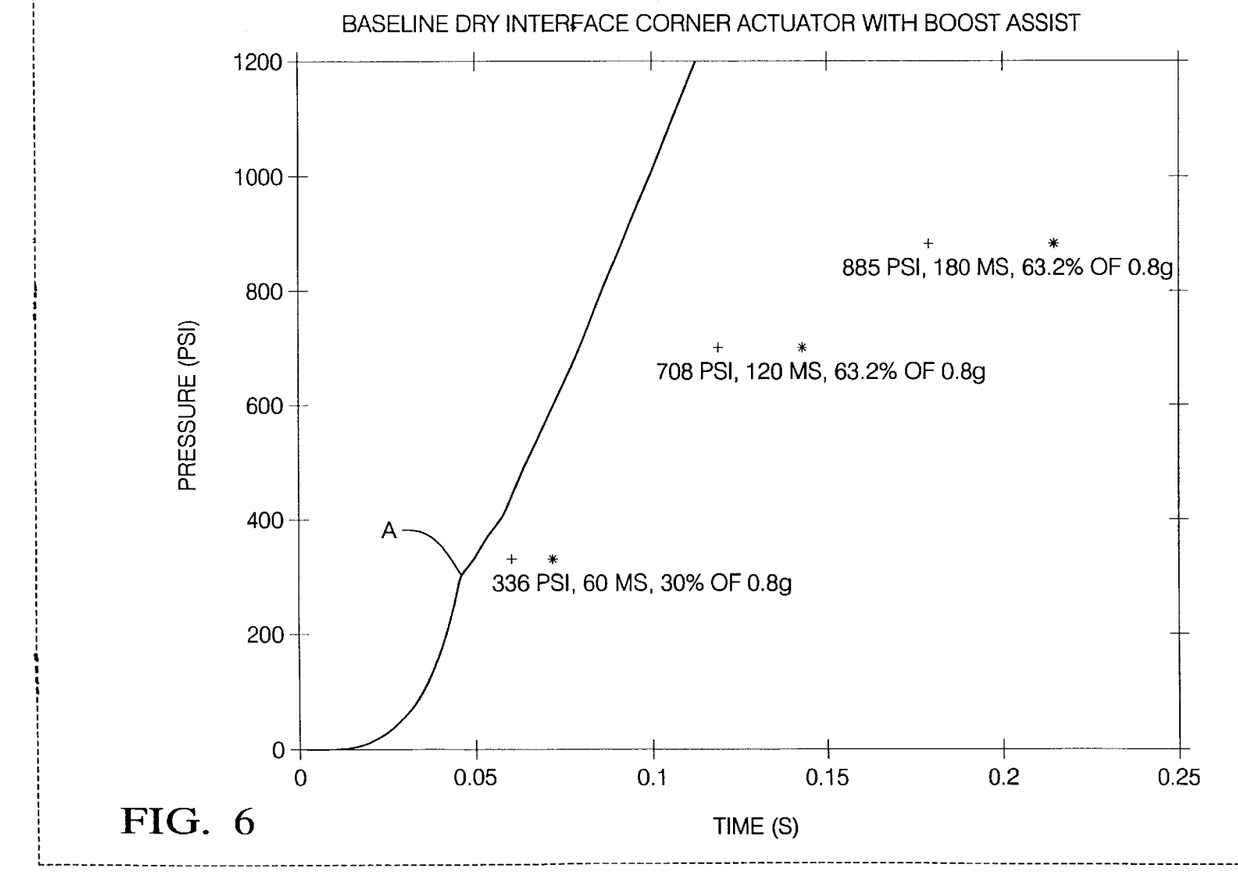
FIG. 6 is a graphical illustration showing the boost assist accomplished by the present invention.

In general, upon reopening solenoid valve 26, the rate of release of trapped fluid in cavity 76 needs to be slow enough in order that the pressure build up to wheel brake 33 is approaching the maximum pressure level, as shown in FIG. 6 (in reaching maximum motor stall torque) prior to step piston 34 fully returning to the initial position. This allows additional fluid displacement to be made up when step piston 34 shuttles back to the right, as shown in FIG. 5. The tuned time delay, in the return of step piston 34, results in an optimum maximum brake apply response curve as shown in FIG. 6. As can be seen at point A of FIG. 6, valve 26 is reopened but the upper portion of the curve does not significantly lose the initial pressure from step piston 34. If the release rate of the trapped fluid in cavity 76 were too fast, step piston 34 would move too quickly to the right. Such a fast displacement loss would cause a lag in the response curve and negate the gains achieved by the momentary closing of solenoid 26 during a maximum brake apply.

The invention has been described with reference to the preferred embodiment. Obviously, modifications and alterations will occur to others upon reading and understanding this specification. It is intended to include all such modifications and alterations in so far as they come within the scope of the appended claims.

Having thus described the invention, it is claimed:

1. A braking assembly for providing a braking force to a wheel based upon receipt of an electrical brake signal, said braking assembly comprising an actuator including a motor that applies and releases a piston within an actuator body, said actuator fluidly connected to a wheel brake whereby said wheel brake can be applied and released, a first valve interposed between said actuator and said wheel brake on a first fluid path for opening and closing said fluid connection on said first fluid path including means for increasing said fluid displacement on a second fluid path between said actuator and said wheel brake when said first valve is closed.

2. The brake assembly of claim 1, wherein said means for increasing said fluid displacement includes a piston having at least first and second surfaces, an area of said second surface being generally greater than an area of said first surface.

3. The brake assembly of claim 2, wherein said first and second surfaces are in said second path and are generally perpendicular thereto.

4. The brake assembly of claim 1, wherein said means for increasing said fluid displacement includes a T-shaped piston in said second path.

5. The brake assembly of claim 4, wherein said T-shaped piston is comprised of adjacent coaxial cylinders of differing diameter.

6. The brake assembly of claim 1, including a second valve assembly disposed on said second path between said actuator and said means for increasing said fluid displacement.

7. The brake assembly of claim 6, wherein said second valve assembly includes a control orifice in said second path to undirectionally slow a flow rate in said second path.

8. A method of initially boosting brake pressure comprising; providing a brake actuator assembly having a fluid displacement rate;
   providing a wheel brake;
   connecting said brake actuator assembly to said wheel brake by a first fluid path and by a second fluid path;
   generating an electrical brake signal to activate said brake actuator;
   measuring said brake signal;
   closing said first path upon determining said brake signal generated exceeds a first preset value;
   multiplying said fluid displacement rate in said second path;
   providing said increased fluid displacement to said wheel brake via said second path;
   reopening said first path upon determining said fluid pressure in said second path exceeds a second preset value.

9. The method of claim 8, wherein said first preset value is generally in the range of 3000 psi per second equivalent rate of change of pedal force or travel input.

10. The method of claim 8, wherein said step of multiplying said fluid displacement doubles said rate of fluid pressure increase in said second path.

11. The method of claim 10, including generally instaneous doubling said rate of increase of fluid pressure in said second path.

12. The method of claim 8, wherein said second preset value is generally in the range of 400–500 psi.

13. The method of claim 8, including controllably reducing said fluid displacement in said second path after said step of reopening said first path.

14. The method of claim 13, wherein said step of controllably reducing said fluid displacement includes reversing the direction of said fluid flow in a portion of said second path.

15. The method of claim 8, including providing a step piston for accomplishing said step of multiplying said fluid displacement rate in said second path.

16. The method of claim 15, including reversing the direction of said fluid flow between said step piston and said brake actuator assembly in said second path after said step of reopening said first path.

17. A braking system for providing a braking force to a plurality of wheels, said braking system comprising:
   a plurality of actuators for braking said plurality of wheels with a fluid displacement pressure, each said actuator fluidly connected to at least one wheel brake on a first fluid path whereby said wheel brake can be applied and released;
   means for sensing a brake force applied to a brake pedal;
   means for electrically generating a brake signal to said plurality of actuators based upon said sensed force applied to said brake pedal;
   means for opening and closing said first path, said first path closed when said brake signal exceeds a first preset value and said first path open below said first preset value;
   means for momentarily multiplying said fluid displacement in a second fluid path;
   means for measuring said fluid pressure generated in said second fluid path; and
   means for signaling said means for opening and closing to open said first path upon determining said fluid pressure in said second path exceeds a second preset value.

18. The system of claim 17, wherein said means for opening and closing said first path includes a solenoid valve disposed on said first fluid path.

19. The system of claim 18, wherein said means for multiplying a fluid displacement rate in said second fluid path includes a step piston.

20. The system of claim 19, wherein said step piston is comprised of adjacent coaxial cylinders of differing diameter.

21. The system of claim 20, including means for unidirectionally slowing said flow rate in said second path.

22. The system of claim 17, wherein said means for signaling said fluid pressure generated in said second fluid path includes a pressure sensor.

23. The system of claim 17, wherein said means for multiplying said fluid displacement is means for momentarily multiplying said rate of fluid pressure increase.

24. A braking system for providing a braking force to a plurality of wheels, said braking system comprising:

a plurality of actuators for braking said plurality of wheels with a fluid displacement pressure, each said actuator fluidly connected to at least one wheel brake on a first fluid path whereby said wheel brake can be applied and released;

a first sensor attached to a brake pedal for sensing a force applied to said brake pedal;

a signal generator for generating a brake signal to said plurality of actuators based upon said sensed force applied to said brake pedal;

a valve for opening and closing said first path, said first path closed when said brake signal exceeds a first preset value and said first path open below said first preset value;

a fluid displacement multiplier for momentarily multiplying said fluid displacement in a second fluid path;

a second sensor for measuring said fluid pressure generated in said second fluid path; and a controller for signaling said valve to open said first path upon determining said fluid pressure in said second path exceeds a second preset value.

* * * * *